Figure 4:
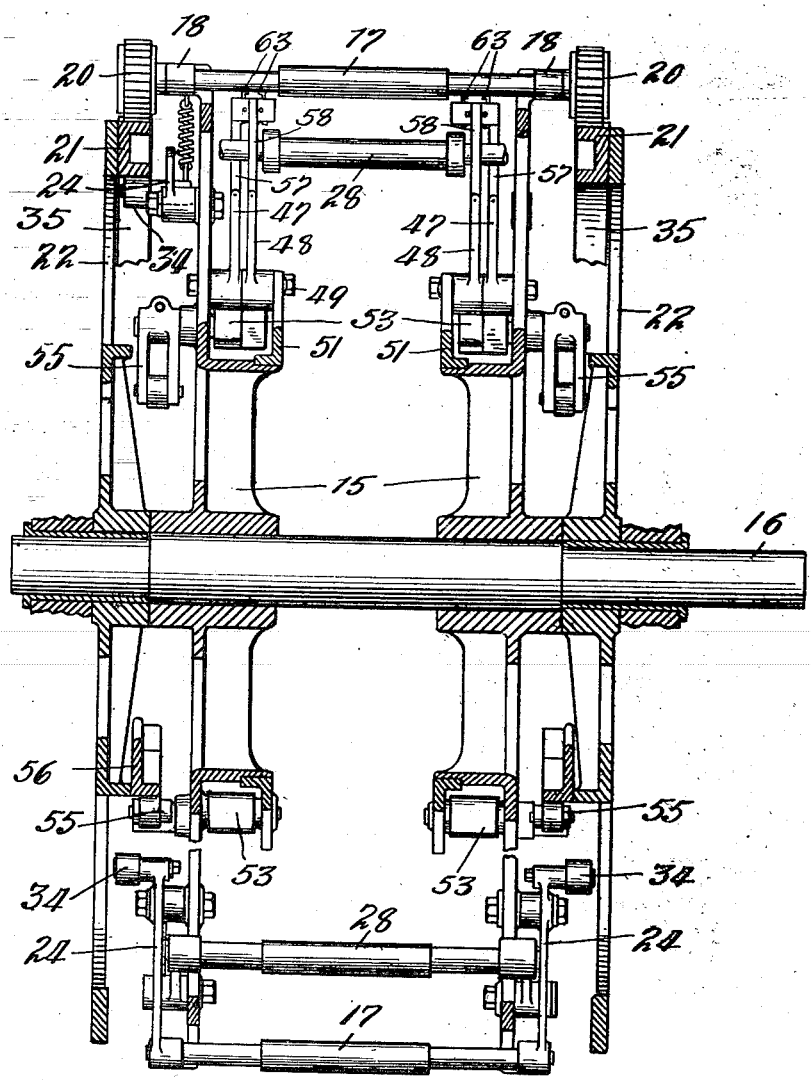

E. C. THORSCHMIDT.
CANDY WRAPPING MACHINE.
APPLICATION FILED FEB. 18, 1913.
1,163,709.
Patented Dec. 14, 1915.
7 SHEETS—SHEET 1.
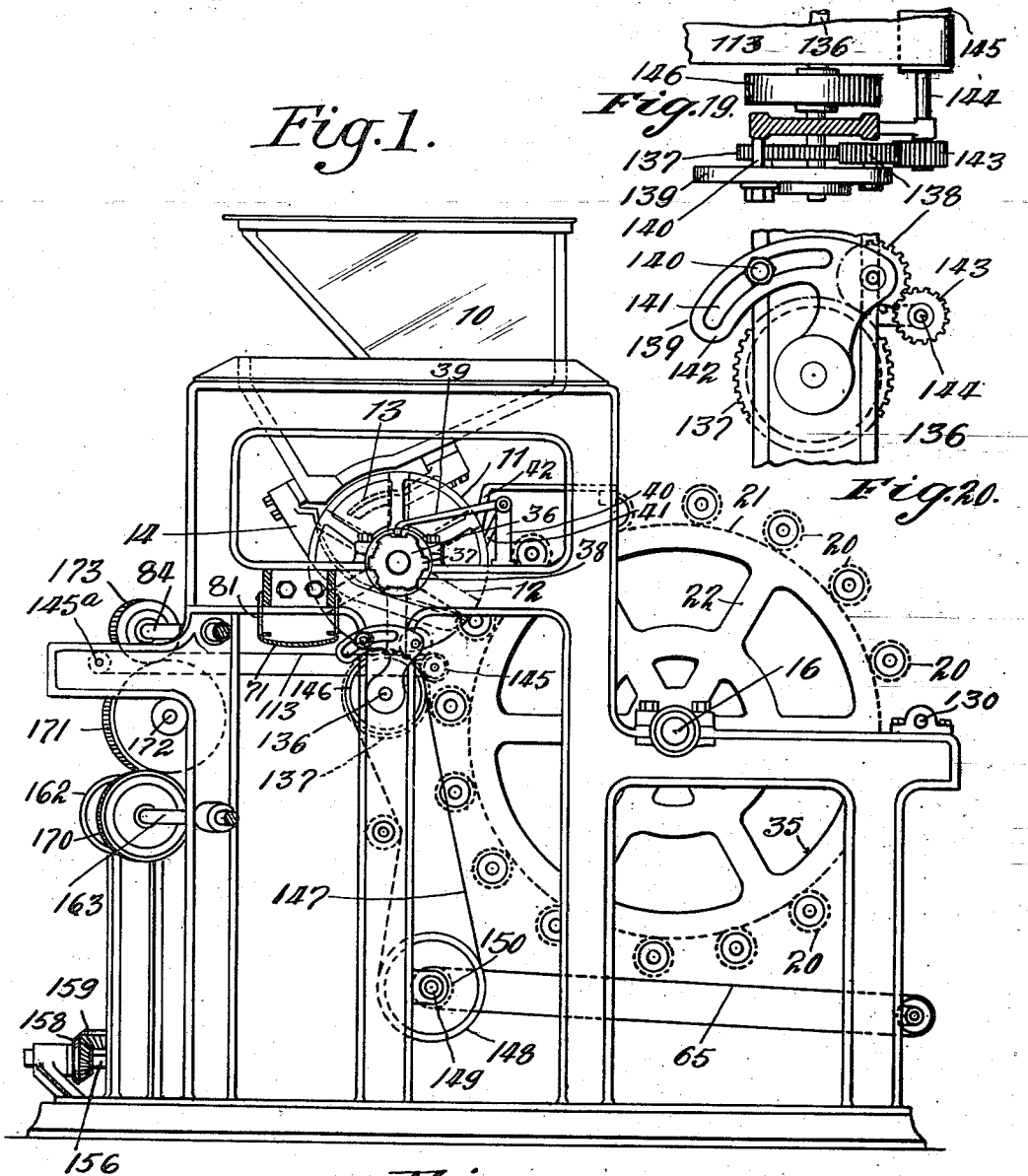
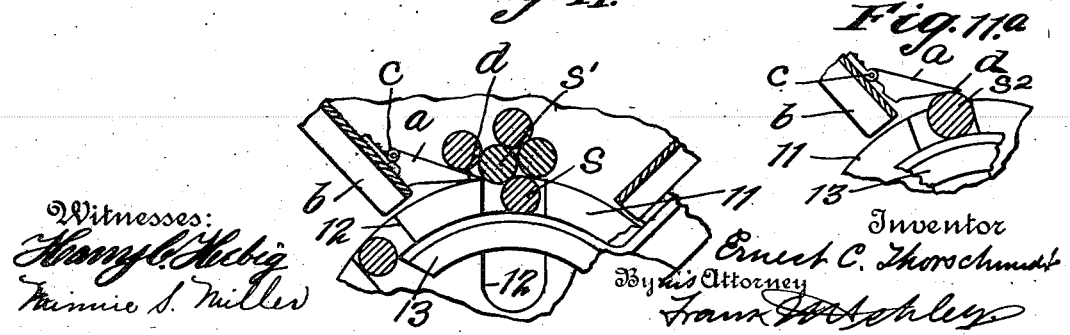

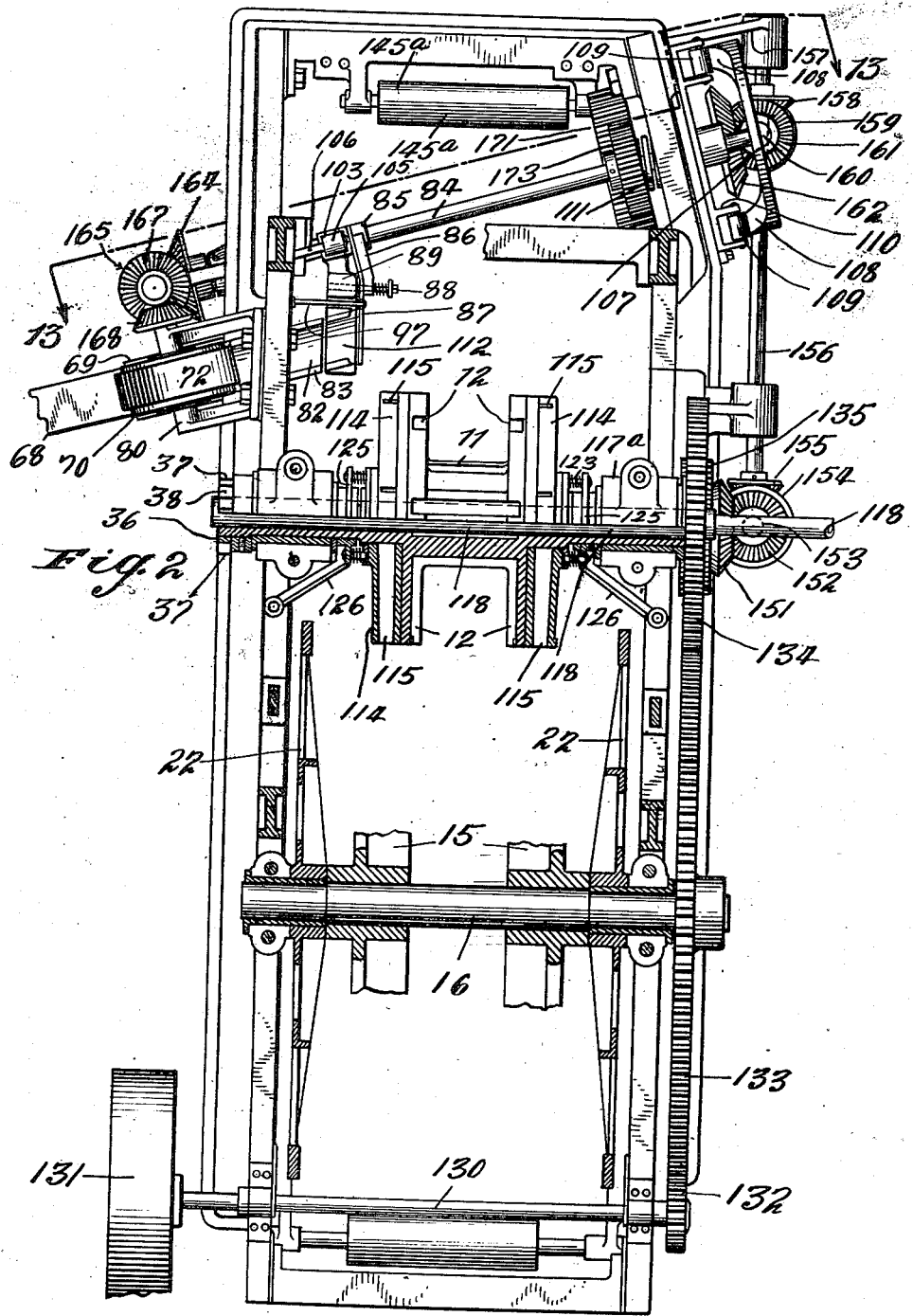

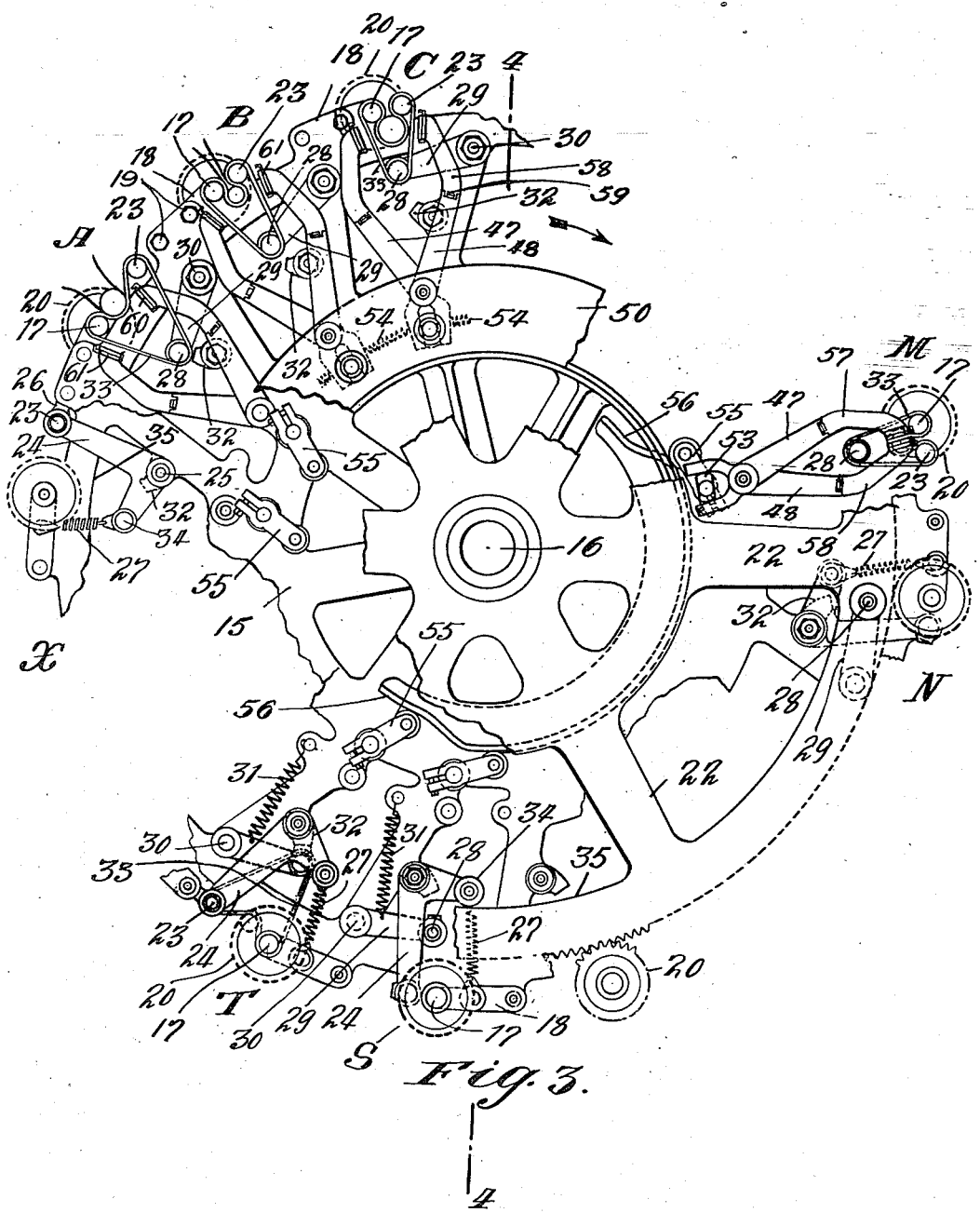

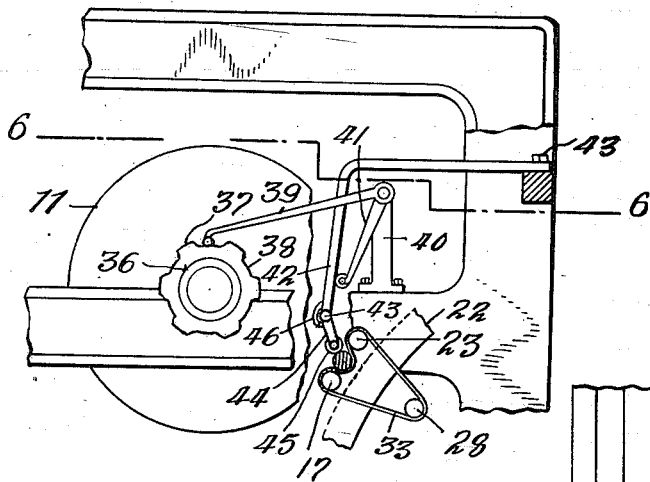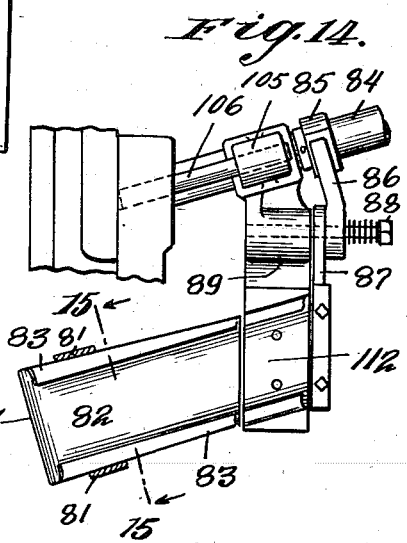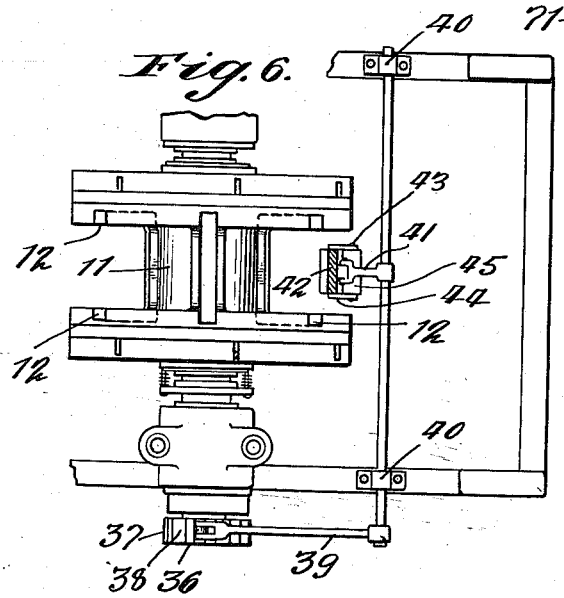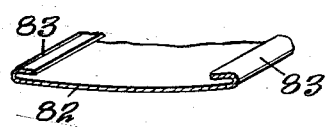

E. C. THORSCHMIDT.
CANDY WRAPPING MACHINE.
APPLICATION FILED FEB. 18, 1913.
1,163,709.
Patented Dec. 14, 1915.
7 SHEETS—SHEET 6.
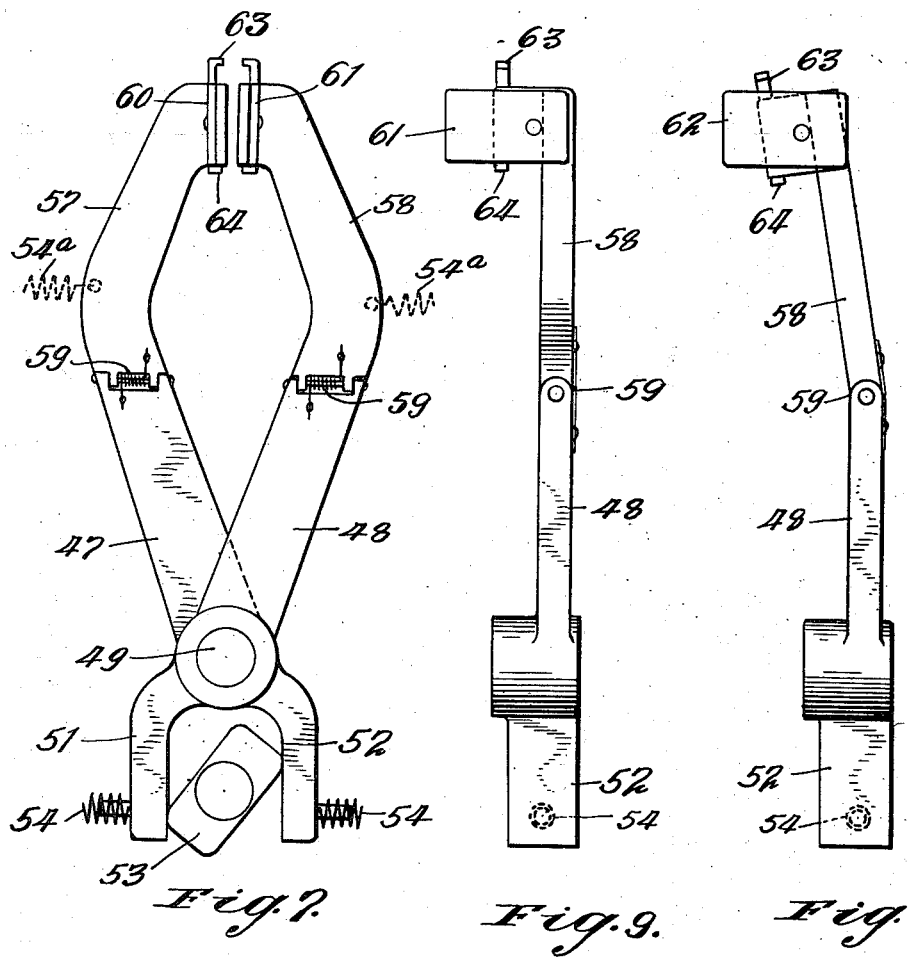
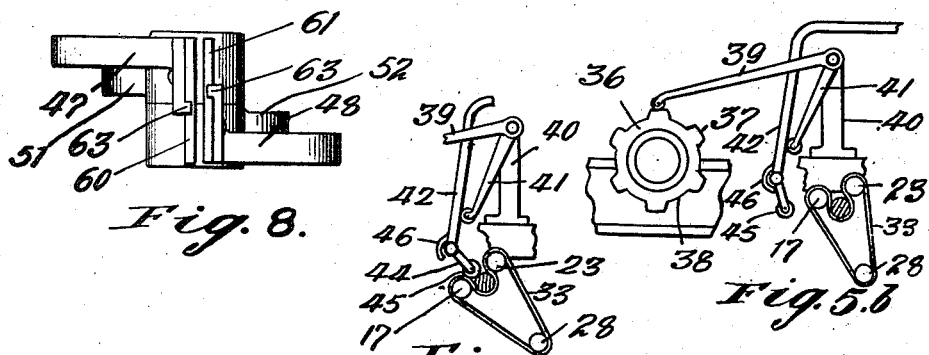

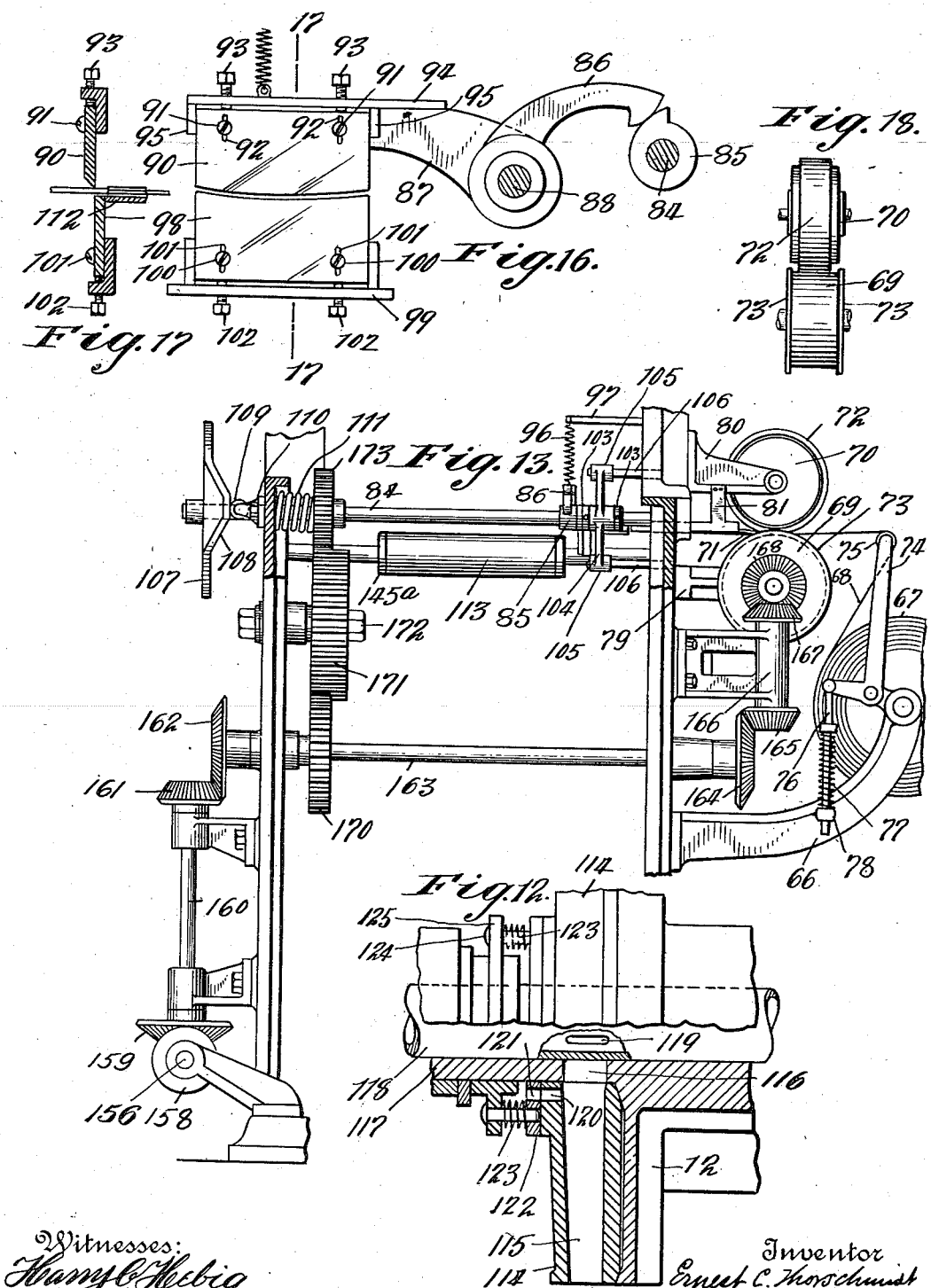

UNITED STATES PATENT OFFICE.

ERNEST C. THORSCHMIDT, OF NEW YORK, N. Y.

CANDY-WRAPPING MACHINE.

1,163,709.  Specification of Letters Patent.  Patented Dec. 14, 1915.

Application filed February 18, 1913. Serial No. 749,088.

*To all whom it may concern:*

Be it known that I, ERNEST C. THORSCHMIDT, a citizen of the United States, and a resident of New York, borough of Brooklyn, in the county of Kings and State of New York, have invented certain new and useful Improvements in Candy-Wrapping Machines, of which the following is a specification.

This invention relates to machines for wrapping stick candy or like articles, particularly to the type of machine disclosed in my co-pending application Serial No. 595,990, filed December 7th, 1910.

One object of the present invention is to provide a machine of this character in which sticks of varying diameters may be wrapped with equal efficiency, the machine accommodating itself automatically to such variations.

Another object is to improve the gripping means for holding the ends of the wrappers while the latter are being twisted, so as to allow the grippers to accommodate themselves to the shortening of the wrappers due to the twisting of the ends.

A further object is to improve the general construction of the machine, so as to increase its general efficiency and the speed at which it can be operated.

Still further objects and advantages will appear more fully from the detailed description and the features of novelty in construction and combination of parts will be particularly pointed out in the claims.

In the accompanying drawings, Figure 1 is an elevation of my improved machine with some parts removed, others broken away and still others indicated diagrammatically for the sake of clearness. Fig. 2 is a sectional plan view of the machine, certain parts being omitted and broken away for the sake of clearness. Fig. 3 is a detail with parts broken away and others indicated diagrammatically, illustrating the wrapping and gripping mechanism. Fig. 4 is a section taken along line 4—4 of Fig. 3. Figs. 5, 5ª and 5ᵇ are detail elevational views illustrating in various positions the tapping mechanism for forcing each stick in place while the wrapping band is actuated to engage its periphery. Fig. 6 is a plan of the tapping mechanism taken along the line 6—6 of Fig. 5. Fig. 7 is a detail elevation, and Fig. 8 is a plan view of the grippers for holding the ends of the wrappers. Figs. 9 and 10 are side views illustrating the individual members of the gripping devices in their various positions. Fig. 11 is a detail of the scoop for preventing the admission of more than one stick in a pocket. Fig. 11ª is a detail of the scoop illustrating the position it assumes when a stick of large diameter passes under the same. Fig. 12 is a detail view illustrating a device for admitting air into the suction ducts when the wrapper is to be released. Fig. 13 is a section taken along lines 13—13 of Fig. 2, illustrating the paper feed and cutting mechanism. Fig. 14 is a detail plan view illustrating the guide for the paper, the cutting mechanism, and means for actuating the same. Fig. 15 is a fragmental detail illustrating in perspective the paper guide, the fragment being cut at the line 15—15 of Fig. 14. Fig. 16 is an elevational detail view illustrating the cutting knives and the cam for operating the same. Fig. 17 is a section taken along line 17—17 of Fig. 16. Fig. 18 is a detail view illustrating the paper feeding and gripping rolls. Fig. 19 is a sectional plan, and Fig. 20 is an elevation illustrating in detail the gearing connection between the endless conveyer belt for the wrappers and the endless conveyer belt on which the wrapped sticks are delivered.

The sticks of candy are fed from a hopper 10 to a revolving drum 11 consisting of spaced plates having radial slots 12 formed in their opposing faces. These slots constitute recesses in which the individual sticks are held as they are conducted from the hopper to the wrapping mechanism. Guides or tracks 13 and 14 serve to hold the sticks in proper position in their recesses until each stick is dropped over its wrapper into the wrapping device. The wrappers are carried by a suction device connected with the revolving drum and are deposited upon the wrapping mechanism in position to receive the sticks when the latter are dropped thereon. To insure that a single stick only is fed from the hopper to each pocket, I provide a scoop *a* (Fig. 11) hinged to the side *b* of the hopper by a suitable hinge *c*. This scoop terminates at its outer end in a sharp edge *d* located closely adjacent the drum. Should two sticks *s* and *s'* be contained in the same recess, the upper one *s'* will be scraped away by the sharp edge $d$ which contacts the same below its center line. Should, however, a large stick $s^2$ (Fig. 11$^a$) come in contact with the scoop $a$, such stick will not be broken up by the same, but will merely cause the scoop to swing up at its hinge as illustrated in this figure, inasmuch as the scoop contacts the stick above its center line.

The wrapping mechanism proper operates on the general principle of my co-pending application, the wrapper and stick being engaged by an endless band which partially embraces the stick and rotates the latter so as to wrap the wrapper about it. However, the construction and mode of operation are improved, as will presently appear. A pair of carriers 15 are fixed upon a rotatable shaft 16, and mounted upon the carriers are a plurality of sets of wrapping devices which for convenience, I designate generally as A, B, C, M, N, S, T and X (Fig. 3). Only a few of these sets are shown and portions of these are omitted or cut away for the purpose of clearness and to prevent needless duplication. Each of these wrapping devices comprises a roll 17 (Figs. 3 and 4) suitably journaled in brackets 18, secured at the periphery of the carriers by suitable means, as bolts 19. Fixed to the outer ends of the rolls are a pair of actuating wheels 20. These wheels are preferably formed with V shaped teeth and engage similarly toothed segmental tracks 21, attached to stationary wheels 22 which are suitably fixed to the frame of the machine. Adjacent to each roll 17 and substantially along the same arc therewith in reference to the axis of the carriers 15, is a roll 23 mounted upon swinging bearings 24. The latter are preferably in the form of a bell-crank lever fulcrumed to the carriers at points 25 and yieldably held against stops formed by shoulders 26, disposed on the periphery of the carriers, so as to maintain the rolls 17 and 23 spaced from each other. The means for yieldably holding each swinging bearing against its stop consists preferably of a spring 27 connected to the short arm of the bell-crank at one end and attached to its other end to a convenient point upon the carrier. Thus, one of the bolts 19 may be used also for attaching this spring. Located a short distance from the rolls 17 and 23 at a point substantially between these rolls and the axis of the carriers is another roll 28 mounted upon swinging bearings 29 pivoted on suitable pins 30 extending through the carriers. These swinging bearings 29 are also yieldably held away from the rolls 17 and 23 by means of springs 31 which normally hold these bearings against suitable stops 32. Extending about each set of these rolls 17, 23 and 28 is an endless band 33 which is normally kept extended substantially in the form of a triangle in the position indicated at A. As the carriers are rotated and the wheels 20 engage the stationary segmental tracks 21, the former together with the rolls 17 are rotated and drive the band 33 about the rolls 23 and 28. By reason of the character of the teeth of the wheels and tracks, the latter readily come into mesh.

When each stick of candy leaves the drum 11, it is deposited over its wrapper in the wrapping device A. Then the rolls 17 and 23 are brought together so as to cause the band to form a pocket embracing the stick and tightly holding the same, whereupon the motion of the band will be communicated to the stick and its wrapper to cause the latter to be wrapped about the former, as in my prior application. It will be seen that by reason of the swinging bearings for the rolls 28, the bands can accommodate themselves for various thicknesses of sticks. Thus, in the unit B, a small stick is shown snugly embraced in the pocket formed in the endless band, while in the unit C a large stick is shown also snugly embraced. It will be noted that in the latter unit, the roll 28 is swung outward farther on its bearing 29 than is the case in the unit B. This additional movement of the roll plays out an added length of band for embracing the thicker stick.

For actuating the swinging bearings 24 to close the rolls 17 and 23 about the stick so as to form a pocket in the band embracing the stick, I provide the short arms of the bell-cranks constituting the swinging bearings 24 with rollers 34, which are adapted to engage cam tracks 35. As the wrapping devices are advanced from the position A to the position B, the rollers 34 hit the cam tracks 35 and thus swing the bearings 24 in position at which the band 33 embraces the stick as indicated in positions B and C.

As the bearings 24 are swung to cause the band to properly engage the stick, the latter is pressed inward by the following mechanism (Figs. 1, 5, 5$^a$, 5$^b$): Fixed to rotate with the drum 11 is a cam wheel 36, having on its periphery a series of segmental teeth 37, separated by notches 38. The periphery of this wheel is engaged by an arm 39 of a lever, fulcrumed in a bracket 40, fixed at a suitable point on the frame of the machine. The other arm 41 of this lever engages a stiff, flat spring 42, fixed at one end in any suitable manner as by a bolt 43, to a suitable point on the frame and provided at its other extremity with a toggle arm 44, carrying a roller 45. A stop 46, formed upon the spring 42, keeps the toggle arm 44 in an inclined position such as indicated in Fig. 5. As the stick of candy is carried in its wrapping mechanism from the position A to the position B, during which time the rolls 17 and 23 are forced toward each other, the stick is simultaneously engaged by the roller 45 of the toggle arm and is forced inward until the toggle arm is brought in substantial alinement with a radial line through the carrier, as indicated in Fig. 5ª. At that time, the rolls 17 and 23 are sufficiently close to each other to retain the stick between them, the latter having passed the center lines of the rolls. Immediately thereafter, one of the teeth 37 engages the extremity of the arm 39 and thus, through arm 41, forces the spring 42 outward, withdrawing the toggle arm 44 from engagement with the stick and freeing the same from the rest of the mechanism. This arm then drops down as indicated in Fig. 5ᵇ.

After the wrapper has been wrapped about the stick, the projecting ends of the former are twisted so as to secure the same to the stick as explained in my copending application. For this purpose, I provide a series of grippers (Figs. 3, 4, 7, 8, 9 and 10) consisting of pairs of tongs 47 and 48 pivoted preferably on common pivots 49 extending through the body of the carriers 15 and through annular flanges 50 attached thereto. Extending inwardly from the gripping tongs 47 and 48 are arms 51 and 52 between which is rotatably mounted, in a suitable bearing formed in the carrier, a cam 53. When the latter is rotated so as to separate the arms 51 and 52 against the tension of springs 54 bearing against these arms, the gripping tongs 47 and 48 are brought together so as to grip the ends of the wrappers projecting beyond the sticks. Continued rotation of the sticks and their enveloping wrappers by the endless bands, while the ends of the wrappers are thus held relatively stationary, causes the ends to be twisted, as will be readily understood. A suitable arm 55 may be attached to each of these cams 53 and is swung to rotate the cam at the proper time by engaging a stationary segmental cam track 56 attached to the stationary wheels 22. Instead of the compression springs 54, tension springs 54ª may be secured to the arms 57 and 58 (Fig. 7).

As the ends of the wrappers are twisted, they decrease in length as will be readily seen. The ends, therefore, will tend to approach the stick. To take up this motion, I provide the tongs 47 and 48 with hinged gripper arms 57 and 58, (Figs. 7 to 10). Springs 59 are disposed about the hinges, tending constantly to keep the arms in alinement with the body of the tongs. It will thus be seen that as the ends of the wrappers shorten by reason of being twisted, the arms 57 and 58 will approach the stick against the tension of the light springs 59. As these tension swing about their hinges, their jaws 60 and 61 are lowered as clearly appears in Fig. 10. To prevent this lowering of the jaws from tearing away the ends of the wrappers, I provide the jaws with pivoted gripping faces 62 which directly engage the wrappers. While the arms 57 and 58 together with their gripping jaws swing, the gripping faces 62 maintain substantially the same position in alinement with the wrappers and thus prevent any lateral strain from being exerted upon the same. To prevent the gripping faces dropping out of position during rotation of the carriers, I provide stops 63 and 64 formed respectively at the top and bottom of the gripping jaws 60 and 61. These stops confine to the required narrow limits the movement of the gripping faces with reference to the jaws. After the required twist has been given to the ends of the wrapper, the wrapped stick is released and when it arrives in the position T, shown in Fig. 3, it drops upon an endless conveyer 65 mounted below the carriers and is conveyed to a suitable receptacle placed near the machine.

I will now describe the means whereby the paper for the wrappers is fed to the wrapping devices: Mounted upon the frame of the machine at a suitable point to the rear of the hopper, is a bracket 66 carrying a roll of paper or similar wrapping material 67. The paper is fed in the form of a web 68 by a pair of feed rolls 69 and 70 which grip the paper and feed it into a guide 71. The feed roll 70 has a gripping surface 72 of some suitable yielding friction material such as rubber or the like disposed in the form of a ridge on the face of the roll. The opposing roll 69 has guide flanges 73 formed at each side to properly guide the material. The latter roll is suitably driven by a train of gearing hereinafter described. A suitable tension device is provided for the web, so as to maintain it in proper position to be led to the feed rolls. This tension device consists preferably of a lever 74 fulcrumed upon the bracket 66 and provided at one end with a roll 75 over which the paper passes in substantial alinement with the gripping point of the feed rolls 69 and 70. At its other ends, this lever is engaged by impelling means such as a rod 76 yieldably held upward by a spring 77 abutting a lug 78 through which the lower end of the rod passes. The feed rolls 69 and 70 are mounted in suitable brackets 79 and 80. From the latter bracket preferably projects a hanger 81 supporting the outer extremity of the guide 71 into which the paper is conducted from the feed rolls as previously described. This guide is in the form of a plate having a slightly concave bottom 82 and upturned lateral edges 83. The guide gradually converges in width so as to rectify the paper in case it should enter the same slightly out of proper alinement.

After the paper leaves the guide, it is cut in the proper lengths and conveyed to the drum 11 which takes up the individual wrappers by means of its suction devices and conducts them into the proper place with reference to the wrapping mechanism. It will be noted from Fig. 2, that the bracket 66, the feed rolls and paper guide are all mounted at an angle to the frame, so as to feed the paper at an incline with reference to the length of the machine. This is done with the purpose in view of cutting the individual wrappers with inclined edges, so that the wrappers will more readily be wrapped about the sticks, as will be readily understood.

The cutting mechanism is also mounted at an incline with reference to the frame and is driven by a train of gearing hereinafter described. The cutter actuating shaft 84 has mounted thereon a cam 85 engaging an arm 86 of a lever 87, fulcrumed upon a pin 88, extending from a bracket 89. A suitable knife blade 90 is adjustably attached to the lever 87 in any desired manner as by screws 91 passing through slots 92 in the blade. Set screws 93 passing through the plate 94 formed on the lever 87 constitute adjustable abutments against which the back of the blade may be adjusted. Lugs 95 projecting downward from the plate constitute guides for the ends of the blade. A spring 96 is connected to the lever 87 and extends to a projection 97 formed on the frame and thus holds the knife away from the paper. At every revolution of the cutter actuating shaft 84, the knife 90 is brought down to cut a length of wrapper. The opposing knife or shear plate 98 is also adjustably mounted in a socket plate 99 and is guided and adjusted by holding screws 100 passing through the slots 101 and the set screw 102 forming the abutments for the back of the blade. The plate 99 is attached to the bracket 89 to which, it will be remembered, the knife lever is fulcrumed.

As will be readily understood from the foregoing description, the paper is fed continuously and is cut by the cutter knife while it is being fed. It is necessary, therefore, that the knife be given a movement in the direction of the feed of the paper while it is cutting the same. For this purpose, during the time that the knife is actuated, the latter together with the bracket 89 and the cutter actuating shaft are given a longitudinal motion in the direction of the motion of the paper. The bracket 89 is, therefore, loosely mounted upon the shaft 84 between two collars 103 fixed to the shaft.
A pair of arms 104 project from each side of this bracket and are provided with eyes 105 forming bearings extending over guide rods 106 attached to the frame of the machine. A disk 107 is fixed to the cutter shaft and is provided with a pair of diametrically opposite cam projections 108 in the path of which project rollers 109 suitably mounted upon brackets 110 secured to the frame. Each time that the shaft moves into the position for actuating the knife to shear off a portion of the paper, the cam projections 108 engage the rollers 109 and cause the shaft 84 to move longitudinally against the tension of a spring 111 disposed between a suitable abutment attached to the shaft and the adjacent side of the frame. The shaft in so moving longitudinally, carries with it the bracket 89 together with the cutting knives. It is clear that by means of the guide rods 106, the bracket is maintained in its proper horizontal position.

As has been previously explained, the bottom of the guide plate 71 in which the paper is guided as it approaches the cutter, is of concave contour and thus causes the paper to assume a corresponding curve as it approaches the knife. This formation of the paper stiffens it sufficiently so that a length sufficient for a wrapper may extend past the knives without sagging down. To maintain this curve of the paper, the bracket 89 has attached thereto a curved guide 112 of a shape similar to the adjacent end of the guide 71. Also the edges of the knives 90 and 98 are correspondingly curved. As each wrapper is cut from the web of paper, it is deposited upon a conveyer 113 consisting preferably of an endless belt suitably driven, as hereinafter described, and is conveyed thereby to the drum 11 which picks it up with the suction device carried thereon.

The suction device consists of plates 114 secured to the drum provided with radial slots 115 forming ducts in alinement with apertures 116 formed in the drum sleeve 117 which is journaled in suitable bearings 117ª. In this sleeve is mounted a stationary conduit or pipe 118. The latter is connected in any suitable way with a suction pump and is provided with a pair of ports 119 with which the ducts 115 communicate during a portion of the rotation of the drum. When one of the ducts 115 passes the conveyer 113, it opens into the port 119 and sucks up the wrapper and carries it until it is brought to the wrapping mechanism in position at which the stick of candy is deposited upon it to be engaged by the wrapping bands. When the wrapper has been so brought to the proper position with reference to the wrapping mechanism, the duct 115 passes by the port 119 and is thus relieved of the suction. Simultaneously with the release of the suction, air is admitted through ports 120 which are then brought into registration with apertures 121 formed in washers 122 held against the plates 114 by springs 123 mounted on pins 124 extending from stationary brackets 125 encircling the sleeve 117 and each provided with an arm 126 fastened to a suitable point on the frame. As the suction is cut off from the ducts 115 and air is supplied thereto, the wrapper is readily released and drops in proper position upon the wrapping band.

The mechanism for driving the various movable parts of the device are as follows: Mounted in suitable bearings at the front of the frame is a shaft 130 driven from any source of power, driving the pulley 131 which is fixed to the shaft. On the opposite end of the shaft is mounted a pinion 132 which meshes with a large gear 133 fixed upon the shaft 16, which, it will be remembered, has the carriers for the wrapping devices mounted thereon. This gear 133 meshes with a similar gear 134 attached to the sleeve 117 of the drum 11. The ratio of the gears 131 and 134 is such that a pocket containing a stick of candy is brought into proper position with reference to the wrapping device as they are successively brought into position by their carriers. Below the gear 134 is mounted another gear 135 fixed to a shaft 136 which runs across the frame. On the opposite end of this shaft is mounted a gear 137 which meshes with the pinion 138 carried in a bracket 139 pivoted upon the shaft 136 and adjusted and clamped by a screw bolt 140 passing through a slot 141 formed in an arcuate extension 142 formed on the bracket. The latter may be adjusted so as to throw the pinion 138 in mesh with another pinion 143 mounted upon shaft 144, carrying a roll 145, by which the conveyer 113 is driven. It will be understood that this conveyer extends also over another roll 145ª journaled adjacent to the end of the frame. Fixed upon this shaft 136 also is a pulley 146 carrying a belt 147 which drives another pulley 148 mounted upon shaft 149, carrying the roll 150, which drives the conveyer belt 65 upon which the wrapped candy sticks are discharged from the wrapping devices.

For driving the feed rolls and the cutting mechanism for the paper, the following gearing is provided: Fixed to the shaft 136 adjacent to the gear wheel 135 is a bevel gear 151 meshing with a corresponding bevel gear 152 fixed to a vertical shaft 153. At the lower end of this shaft is fixed another bevel gear 154 which meshes with a bevel pinion 155 fixed to a horizontal shaft 156 running to the end of the frame where it is suitably journaled in a bearing 157. Adjacent to this bearing another bevel pinion 158 is fixed to the shaft 156 meshing with a bevel gear 159 mounted upon a vertical shaft 160, at the upper end of which is mounted a bevel gear 161 meshing with a bevel gear 162 fixed to a horizontal shaft 163 which runs obliquely across the frame. At its opposite end, the shaft 163 has a bevel gear 164 fixed thereto meshing with a bevel pinion 165 fixed on a vertical stub shaft mounted in a suitable bearing 166. At the upper end of this stub shaft is fixed another bevel pinion 167 meshing with a bevel gear 168 attached to the shaft upon which the feed roll 69 is mounted. Thus, the feed rolls are driven at a speed corresponding to the motion of the drum 11.

For driving the cutting mechanism, a gear 170 is attached to the shaft 163 meshing with a wide faced idler gear 171 mounted upon a pin 172 projecting from the frame, the latter gear meshing with a pinion 173 attached to the cutter actuating shaft 84. As the drum 11 rotates, it transmits its movement by the train of gearing above described to the cutter actuating shaft, thus actuating the cutter knives to shear off the proper size of wrapper. By reason of the wide face of the idler 171, the longitudinal motion of the cutter actuating shaft 84 will not throw it out of mesh with this gear.

Having thus described my invention, I claim

1. In a machine of the character described, continuously moving means for conveying the article to be wrapped and depositing the same upon the wrapping mechanism, means for conveying the wrapper, wrapping mechanism comprising an endless band upon which the article with its wrapper are deposited, means for depressing the article upon the band so as to form a pocket therein, means for actuating the band to rotate the article together with its wrapper and means for yieldingly holding the band as to allow it to play out to accommodate articles of various thicknesses.

2. In a machine of the character described, continuously moving means for feeding articles to be wrapped and depositing the same upon the wrapping mechanism, means for conveying the wrappers, wrapping mechanism comprising an extensible pocket, means for depressing the article together with its wrapper into said pocket, and means for actuating the extensible wall of said pocket for rotating the article and its wrapper so as to wrap the latter about the former.

3. In a machine of the character described, continuously moving means for feeding the articles to be wrapped and depositing the same upon the wrapping mechanism, means for conveying the wrappers, wrapping mechanism comprising a pocket having a yielding extensible wall adapted to adjust itself to articles of various thicknesses, means for depressing the article together with its wrapper into said pocket and means for actuating said wall to rotate the article and its wrapper so as to wrap the latter about the former.

4. In a machine of the character described, means for feeding the articles to be wrapped, means for conveying the wrappers, a rotary carrier, a roll mounted upon the carrier, means for actuating the roll, a second roll bodily movable automatically to and fro with reference to the first roll as the carrier revolves, a third roll bodily movable with reference to the first two rolls, and an endless band driven by said rolls and carried thereby, said band forming a pocket into which an article together with its wrapper is deposited and rotated thereby to wrap the wrapper about the same.

5. In a machine of the character described, means for feeding the articles to be wrapped, means for conveying the wrappers, a rotary carrier, a roll mounted upon the carrier, means for actuating the roll, a second roll bodily movable automatically to and fro with reference to the first roll as the carrier revolves, a third roll yieldingly movable bodily with reference to the first two rolls, and an endless band driven by said rolls and carried thereby, said band forming a pocket into which an article together with its wrapper is deposited and rotated thereby to wrap the wrapper about the same.

6. In a machine of the character described, continuously moving means for feeding the articles to be wrapped and depositing the same upon the wrapping mechanism, means for conveying the wrappers, wrapping mechanism comprising a carrier, a roll mounted in bearings fixed to the carrier, said roll having a wheel connected therewith, a relatively stationary track engaged by said wheel during the movement of the carrier, a second roll movable with reference to the first roll, a swinging bearing upon which the second roll is mounted, and means engaged by said swinging bearing for automatically actuating the second roll toward the first roll during a portion of the revolution of the carrier.

7. In a machine of the character described, means for feeding the articles to be wrapped, means for conveying the wrappers, wrapping mechanism comprising a carrier, a roll mounted in bearings fixed to the carrier, said roll having a wheel connected therewith, a relatively stationary track engaged by said wheel during the movement of the carrier, a second roll movable with reference to the first roll, a swinging bearing upon which the second roll is mounted, means engaged by said swinging bearing for swinging the same to force the second roll toward the first roll during a portion of the revolution of the carrier, and an endless band passing over said rolls and forming a pocket in which the article and wrapper are deposited to be wrapped therein.

8. In a machine of the character described, means for feeding the articles to be wrapped, means for conveying the wrappers, wrapping mechanism comprising a carrier, a roll mounted in bearings fixed to the carrier, said roll having a wheel connected therewith, a relatively stationary track engaged by said wheel during the movement of the carrier, a second roll movable with reference to the first roll, a swinging bearing upon which the second roll is mounted, means engaged by said swinging bearing for swinging the same to force the second roll toward the first roll during a portion of the revolution of the carrier, a third roll yieldingly mounted with reference to the first two rolls, and an endless band passing over said rolls and forming a pocket in which the article and wrapper are deposited to be wrapped therein.

9. In a machine of the character described, means for feeding the articles to be wrapped, means for conveying the wrappers, wrapping mechanism comprising a rotary carrier, a roll journaled in bearings fixed to said carrier, a wheel connected to said roll, a stationary track engaged by the wheel during the rotation of the carrier, a bell-crank lever fulcrumed on the carrier, a roll mounted on said bell-crank, an arm pivoted to the carrier and yieldably held inward, a roll mounted in said arm, an endless band passing over said rolls, and a stationary cam engaged by the bell-crank and adapted to actuate the same so as to form a pocket in the band into which the article and its wrapper are deposited to wrap the latter about the former.

10. In a machine of the character described, means for feeding the articles to be wrapped, means for conveying the wrappers, wrapping mechanism comprising a carrier, a roll mounted in bearings fixed to the carrier, means for rotating said roll, a second roll mounted in bearings movable with reference to the carrier, a third roll, an endless band passing over said rolls, means for actuating the movable bearing of the second mentioned roll, and means for engaging the article deposited between the first two rolls to force the same into the pocket formed by the band.

11. In a machine of the character described, means for feeding the articles to be wrapped, means for conveying the wrappers, wrapping mechanism comprising a carrier, a roll mounted in bearings fixed to the carrier, means for rotating said roll, a second roll mounted in bearings movable with reference to the carrier, a third roll, an endless band passing over said rolls, means for actuating the movable bearing of the second mentioned roll, means for engaging the article deposited between the first two rolls to force the same into the pocket formed by the band, the last mentioned means comprising a toggle arm, and means for moving said arm toward and from the carrier.

12. In a machine of the character described, means for feeding the articles to be wrapped, means for conveying the wrappers, wrapping mechanism comprising a carrier, a roll mounted in bearings fixed to the carrier, means for rotating said roll, a second roll mounted in bearings movable with reference to the carrier, a third roll, an endless band passing over said rolls, means for actuating the movable bearing of the second mentioned roll, means for engaging the article deposited between the first two rolls to force the same into the pocket formed by the band, the last mentioned means comprising a toggle arm, a movable mounting for said arm, a lever engaging said mounting, and means for actuating the lever.

13. In a machine of the character described, means for feeding the articles to be wrapped, means for conveying the wrappers, wrapping mechanism comprising a carrier, a roll mounted in bearings fixed to the carrier, means for rotating said roll, a second roll mounted in bearings movable with reference to the carrier, a third roll, an endless band passing over said rolls, means for actuating the movable bearing of the second mentioned roll, means for engaging the article deposited between the first two rolls to force the same into the pocket formed by the band, the last mentioned means comprising an arm, a spring upon which the arm is mounted, a lever engaging the spring, and a cam wheel for actuating the lever to move the mounting so as to throw the arm out of the path of movement of the mechanism on the carrier.

14. In a machine of the character described, means for feeding the articles to be wrapped, means for conveying the wrappers, wrapping mechanism comprising a carrier, means on said carrier for engaging the article and rotating the same so as to wrap the wrapper about it, means for gripping the projecting ends of the wrappers to hold them stationary relatively to the carrier, the last mentioned means comprising radially extending jaws pivoted on the carrier, and means for closing said jaws.

15. In a machine of the character described, means for feeding the articles to be wrapped, means for conveying the wrappers, wrapping mechanism comprising a carrier, means on said carrier for engaging the article and rotating the same so as to wrap the wrapper about it, means for gripping the projecting ends of the wrappers to hold them stationary relatively to the carrier, the last mentioned means comprising pairs of gripping members adapted to be opened and closed, said gripping members having jaws transversely movable with respect thereto to approach the wrapper while the ends are being twisted.

16. In a machine of the character described, means for feeding the articles to be wrapped, means for conveying the wrappers, wrapping mechanism comprising a carrier, means on said carrier for engaging the article and rotating the same so as to wrap the wrapper about it, means for gripping the projecting ends of the wrappers to hold them stationary relatively to the carrier, the last mentioned means comprising gripping members, jaws yieldably movable in a transverse direction with reference to said members so as to approach the article as the ends are being twisted, and means for opening and closing said jaws.

17. In a machine of the character described, means for feeding the articles to be wrapped, means for conveying the wrappers, wrapping mechanism comprising a carrier, means on said carrier for engaging the article and rotating the same so as to wrap the wrapper about it, means for gripping the projecting ends of the wrappers to hold them stationary relatively to the carrier, the last mentioned means comprising movable tongs, jaws hinged to the tongs, and gripping faces pivoted to the jaws.

18. In a machine of the character described, means for feeding the articles to be wrapped, means for conveying the wrappers, wrapping mechanism comprising a carrier, means on said carrier for engaging the article and rotating the same so as to wrap the wrapper about it, means for gripping the projecting ends of the wrappers to hold them stationary relatively to the carrier, the last mentioned means comprising movable tongs, jaws hinged to the tongs, gripping faces pivoted to the jaws, and stops for limiting the movement of the faces.

19. In a machine of the character described, feeding mechanism for the articles to be wrapped, wrapping mechanism, a rotary drum for conveying said articles to the wrapping mechanism, a source of supply for the wrappers, means on said drum for conveying also the wrappers to the wrapping mechanism, said wrapper conveying means comprising suction ducts formed on the drum, a suction conduit having ports with which the ducts may communicate during a portion of the rotation of the drum, and means for admitting air into the suction ducts when the wrappers are brought into proper position with reference to the wrapping mechanism.

20. In a machine of the character described, feeding mechanism for the articles to be wrapped, wrapping mechanism, a rotary drum for conveying said articles to the wrapping mechanism, a source of supply for the wrappers, means on said drum for conveying also the wrappers to the wrapping mechanism, said wrapper conveying means comprising suction ducts formed on the drum, a suction conduit having ports with which the ducts may communicate during a portion of the rotation of the drum, there being openings in said ducts communicating to the atmosphere, and a washer yieldably held against said openings to close the same until the wrapper is brought in proper position with reference to the wrapping mechanism.

Signed at New York city, in the county of New York, and State of New York, this 8th day of February A. D. 1913.

ERNEST C. THORSCHMIDT.

Witnesses:
FRANK M. ASHLEY,
GEORGE DOAN RUSSELL.